Patented Dec. 5, 1950

2,532,525

UNITED STATES PATENT OFFICE 2,532,525

PREPARATION OF A HYDROCARBON CONVERSION CATALYST

Glenn M. Webb, Western Springs, and Reno W. Moehl, Congress Park, Ill., assignors to Universal Oil Products Company, Chicago, Ill., a corporation of Delaware No Drawing. Application July 25, 1947, Serial No. 763,736

5 Claims. (Cl. 252—457)

This invention relates to improvements in the manufacture of catalytic composites of silica and magnesium oxide, and to the use of these improved catalysts in effecting hydrocarbon conversion reactions.

Catalytic composites of silica and magnesium oxide are particularly suitable for effecting various hydrocarbon conversion reactions. These catalysts are especially desirable for use in the cracking of higher boiling oils to produce gasoline, as these catalysts appear to yield a better product distribution than is obtainable with other conventional cracking catalysts. The product distribution obtained with these catalysts includes higher gasoline yields and lower coke and normally gaseous products. In addition, the normally gaseous products formed in the presence of the silica-magnesium oxide catalysts are higher in olefinic constituents and, therefore, permit further increased yields of gasoline by the well known process of polymerization of the gaseous olefins to gasoline. The cracking reaction is generally effected at temperatures within the range of from about 800° to about 1100° F. and at moderately superatmospheric pressures which generally are below about 50 pounds per square inch.

Silica-magnesia catalysts may also find particular utility in other hydrocarbon conversion reactions including (1) treatment of gasoline to improve its anti-knock properties, in the well known processes commonly referred to in the art as reforming, isoforming, retreating, etc., (2) alkyl transfer reactions as, for example, the reaction of xylene with benzene to form toluene, etc., (3) refining of hydrocarbons and particularly gasoline to remove undesirable impurities such as sulfur, etc., (4) alkylation of aromatic or isoparaffinic hydrocarbons with olefinic hydrocarbons, alcohols, esters, etc., (5) polymerization of unsaturated hydrocarbons to form higher boiling products, etc. In addition, these catalysts may find particular utility in the treatment of other organic materials as, for example, the dehydration of alcohols to form hydrocarbons, etc. The temperature and pressure to be employed in the process will depend upon the particular reaction to be effected.

It has been found that the active catalyst for use in cracking reactions requires concentrations of magnesium oxide of at least 20% and generally within the range of from about 20 to about 40% by weight of the final composite. While satisfactory catalysts containing magnesium oxide in this range may be prepared through the use of a salt of magnesium, such as magnesium chloride, magnesium sulfate, etc., this method of preparation is time consuming and expensive because of the high cost of the magnesium salt and because of the large amount of precipitant, such as ammonium hydroxide, required to precipitate magnesium oxide. Another major disadvantage to this method of preparation is the hazard involved in the use of large quantities of ammonia. Generally these catalysts are prepared in open top tanks, with mixing being achieved by agitation with air. This releases large quantities of ammonia into the atmosphere and constitutes a serious health hazard to the plant employees.

The present invention offers a novel method of avoiding the above difficulties.

In one embodiment the present invention relates to a method of manufacturing a silica-magnesia catalyst which comprises commingling silica hydrogel with magnesium hydroxide in the presence of an ammonium salt solution having a pH below about 9.

In a specific embodiment the present invention relates to a method of manufacturing a silica-magnesia cracking catalyst which comprises commingling silica hydrogel spheres with magnesium hydroxide in the presence of an ammonium carbonate solution containing from about 0.3 to about 2 mols of ammonium carbonate per mol of magnesium hydroxide.

In another specific embodiment the present invention relates to the conversion of hydrocarbons and more particularly to the cracking of hydrocarbon oils in the presence of catalysts prepared in the manner herein set forth.

In accordance with the present invention magnesium hydroxide is commingled with silica hydrogel under specific conditions to form active catalytic composites. Magnesium hydroxide is considerably less expensive than the magnesium salts heretofore used, and also avoids the necessity of utilizing an additional reagent to precipitate the oxide from the salt. However, the preparation of active catalysts through the medium of magnesium hydroxide requires the use of specific novel features as herein set forth.

Frequent attempts to prepare active cracking catalysts from magnesium hydroxide and silica have been unsuccessful in the past because the magnesium hydroxide and silica did not react to form the desired silica-magnesia complex which, in the interest of simplicity, is herein referred to as magnesium silicate. Masses prepared by commingling magnesium hydroxide and silica hydrogel are of a low order of activity and X-ray examination of these masses showed only the presence of free silica and magnesium hydroxide or magnesium oxide. Magnesium hydroxide has been found when the mass has been dried at temperatures of the order of 400° F., while magnesium oxide has been found when the mass has been calcined at temperatures of the order of 1000° F.

We have now discovered a novel method whereby magnesium hydroxide can be made to react with silica to produce the magnesium silicate complex. This is accomplished in accordance with the present invention by effecting the reaction of magnesium hydroxide and silica hydrogel in the presence of an ammonium salt solution having a pH of below about 9 in a critical molar proportion as hereinafter set forth. It is believed that the ammonium salt functions to convert the magnesium hydroxide to a form which reacts with the silica. However, it is understood that the invention is not limited to this particular explanation for the improved results obtained.

The improved benefits of the present invention are particularly applicable to the preparation of silica-magnesia catalytic composites in the form of particles of definite and preferably uniform size and shape. Thus the invention is especially useful as applied to the manufacture of spherically shaped catalyst composites. Larger size spheres are within the range of from about 1/64" to about 1/4" in diameter, whereas smaller size spheres, which are generally referred to as microspheres, are within the range of from about 10 to about 150 microns in diameter. The use of spherically shaped catalysts is of extreme advantage in hydrocarbon conversion processes. As applied to moving catalyst type processes, including the fluidized process, the moving catalyst bed process, the suspensoid type process, etc., the spheres do not contain sharp edges which tend to break off and thereby cause fines which are lost in the exhaust gases, the spheres do not cause equipment erosion to the large extent caused by particles containing sharp edges, etc. As applied to stationary bed processes, the spheres effect better contact between the reactants and catalyst by avoiding channeling, etc.

Any suitable ammonium salt solution having a pH below about 9 may be employed within the scope of the present invention. Particularly preferred ammonium salt solutions include those of ammonium carbonate, ammonium bicarbonate and ammonium acetate. Other satisfactory but not necessarily equivalent ammonium salt solutions include those of ammonium carbamate, ammonium nitrate, ammonium nitrite, ammonium sulfate, ammonium chloride, ammonium bromide, ammonium iodide, ammonium fluoride, ammonium formate, ammonium propionate, ammonium butyrate, ammonium valerate, ammonium lactate, ammonium malonate, ammonium oxalate, ammonium palmitate, ammonium benzoate, etc., as well as alkyl or aryl substituted ammonium compounds. It is understood that the above ammonium salts are merely representative and that other suitable ammonium salt solutions having a pH below about 9 may be employed within the broad scope of the present invention.

As another essential feature in the present invention it has been found that the molar proportion of the ammonium salt must be within certain limits. These limits range from about 0.2 to about 2 mols per mol of magnesium hydroxide, and preferably from about 0.5 to about 1 mol. Usually the ammonium salt will be employed in an aqueous solution, but it is understood that other suitable solvents may be used, when desired.

The silica hydrogel may be formed in any convenient manner and generally is formed by the reaction of an acid with an alkali metal silicate solution at a pH controlled to form silica hydrogel. Silica hydrogel spheres are readily prepared by distributing a mixture of acid and water glass, at a pH within the range of from about 6 to about 8, from a rotating disk or through a nozzle into a layer of oil or other suitable medium of sufficient depth so that the silica hydrogel forms into firm spheres during its passage therethrough. Usually a bed of water is disposed beneath the oil bath and the water serves as a medium for transporting the silica hydrogel spheres from the formation zone into a washing zone. It is understood that silica hydrogel spheres may be formed in any other suitable manner within the scope of the present invention.

The silica hydrogel spheres are preferably washed to remove alkali metal ions introduced through the use of water glass or other alkali silicate reagents. The alkali metal ions may be removed in any suitable manner, a particularly suitable method comprising washing with dilute acid solutions, such as those of hydrochloric acid, sulfuric acid, etc. When desired, the silica spheres may be washed with water before and/or after treatment to remove alkali metal ions.

In accordance with the present invention, an ammonium salt solution having a pH below about 9 is added before the magnesium hydroxide is composited with the silica. One convenient method is to add the ammonium salt solution to a slurry of magnesium hydroxide in water, and then add the mixture to the silica hydrogel spheres. Another satisfactory method is to add the ammonium salt solution to the silica hydrogel spheres before adding the magnesium hydroxide thereto, and in still another satisfactory method the magnesium hydroxide slurry and ammonium salt solution may be added simultaneously to the silica spheres. It is essential that the ammonium salt solution be present before the silica and magnesium hydroxide are commingled, so that desired reactions as hereinbefore set forth are effected.

In addition to controlling the reactions occurring between the magnesium hydroxide and silica, the ammonium salt may serve to remove alkali metal ions and thereby eliminates the necessity for special treatment as hereinbefore set forth. The alkali metal ions will be replaced by ammonium ions and the latter may be removed in part by water washing or completely removed during heating of the catalyst in the subsequent drying and calcining treatments.

After the silica and magnesium hydroxide have reacted to form the desired catalytic composite, the composite is preferably washed and dried. In most cases water washing is sufficient, although in some cases it may be desirable to wash the catalyst with an ammonium salt solution. After washing, the catalyst is preferably dried at a temperature of from about 200 to about 500° F. for a period of from about 6 to about 24 hours and, when desired, the catalyst may be calcined at a temperature of from about 900° to about 1100° F. for about 1 to 10 hours or more.

As hereinbefore set forth, the silica-magnesia catalysts are particularly suitable for effecting cracking of higher boiling oils and still more particularly in a moving catalyst type process as exemplified by the fluidized process. The catalysts of the present invention do not contain large amounts of fines and therefore avoid high catalyst losses due to the fines being blown out of the system with the exhaust gases. In the fluidized process the catalyst is carried into the reaction zone by the hydrocarbon oil to be cracked or by other suitable media and, after it has served to effect the cracking reaction, the catalyst is transmitted by air or other oxygen-containing gases into a regeneration zone, wherein hydrocarbonaceous deposits are burned from the catalyst and wherein the regenerated catalyst is separated from the combustion gases. A major proportion of the catalyst loss occurs by the catalyst fines being carried out of the system with the vented combustion gases. These losses are excessive when the catalyst contains a large amount of fines. It is thus seen that catalysts prepared by the present invention, which are low in fines and which are strong in physical characteristics, will result in lower catalyst losses.

The following examples are introduced to further illustrate the novelty and utility of the present invention but not with the intention of unduly limiting the same.

Silica hydrogel spheres were prepared by commingling sulfuric acid with water glass and distributing the resulting mixture from a rotating disk into an oil bath, the pH of the mixture being controlled so that the silica sets to firm hydrogel spheres during passage through the oil bath. The spheres were then washed to remove alkali metal ions.

Silica hydrogel spheres prepared in the above manner when commingled with a slurry of magnesium hydroxide in an amount to yield a final catalyst containing about 29% magnesium hydroxide, and subsequently dried at 400° F. for 8 hours and then calcined at about 1100° F. for 2 hours will have an apparent bulk density of about 0.35, a low catalytic activity, and X-ray examination will show that the mass comprises essentially magnesium hydroxide and silica. The activity of the catalyst is determined by the conversion of a 31° A. P. I. gravity Mid-continental gas oil at a temperature of 932° F., atmospheric pressure and a weight hourly space velocity (defined as the weight of oil per hour per weight of catalyst) of 4.

A series of catalyst was prepared from a batch of silica hydrogel spheres prepared in the manner described above. The silica spheres were commingled with magnesium hydroxide slurries in an amount to yield a final catalyst containing about 29% magnesium hydroxide, and subsequently dried and calcined as hereinbefore set forth. These catalysts were prepared in the presence of an aqueous solution containing different amounts of ammonium carbonate as indicated in the following table.

The apparent bulk densities, activity ratings on a weight basis, and X-ray data of these catalysts are shown in the table. For comparative purposes a catalyst prepared in the absence of an ammonium salt solution was assigned a value of 100 and the activity ratings of the other catalysts are compared thereto on the same basis.

Table

| Buffer, Mol/mol $Mg(OH)_2$ | Apparent bulk density | Activity rating | X-ray data |
|---|---|---|---|
| 0.1 mols ammonium-carbonate. | 0.35 | 155 | Magnesium hydroxide+magnesium silicate. |
| 0.5 ammonium carbonate. | 0.65 | 240 | Magnesium silicate. |
| 1 mol ammonium carbonate. | 0.58 | 275 | Do. |

It will be noted from the data of the above table that the catalyst prepared in the presence of 0.5 and 1 mol of ammonium carbonate per mol of magnesium hydroxide were more than double in catalytic activity and also that these catalysts did not show any magnesium oxide by X-ray examination, whereas the catalyst prepared in the presence of 0.1 mol of ammonium carbonate showed the presence of magnesium hydroxide. It therefore will be noted that the molar proportion of ammonium carbonate should be greater than 0.1 mol per mol of magnesium hydroxide in order to insure complete reaction between the magnesium hydroxide and silica hydrogel.

We claim as our invention:

1. A method of manufacturing a silica-magnesia catalyst which comprises commingling silica hydrogel with a preformed slurry of magnesium hydroxide in the presence of an ammonium salt solution having a pH below about 9 and containing from about 0.2 to about 2 mols of ammonium salt per mol of said magnesium hydroxide.

2. A method of manufacturing a silica magnesia catalyst which comprises forming silica hydrogel spheres, commingling said spheres with a preformed slurry of magnesium hydroxide in the presence of an ammonium salt solution having a pH below about 9 and containing from about 0.2 to about 2 mols of ammonium salt per mol of said magnesium hydroxide, and subsequently washing and drying the spheres.

3. The method of claim 2 further characterized in that said ammonium salt solution comprises an ammonium carbonate solution.

4. The method of claim 2 further characterized in that said ammonium salt solution comprises an ammonium bicarbonate solution.

5. The method of claim 2 further characterized in that said ammonium salt solution comprises an ammonium acetate solution.

GLENN M. WEBB.
RENO W. MOEHL.

REFERENCES CITED

The following references are of record in the file of this patent:

UNITED STATES PATENTS

| Number | Name | Date |
|---|---|---|
| 2,278,590 | Ruthruff | Apr. 7, 1942 |
| 2,355,388 | Michael et al. | Aug. 8, 1944 |
| 2,384,943 | Marisic | Sept. 18, 1945 |
| 2,390,556 | Ruthruff | Dec. 11, 1945 |
| 2,462,236 | Thomas | Feb. 22, 1949 |

FOREIGN PATENTS

| Number | Country | Date |
|---|---|---|
| 556,711 | Great Britain | Oct. 19, 1943 |